Jan. 27, 1970  A. H. ALEXANDER  3,491,867
TWO-HANDED SAFETY CONTROL
Filed April 5, 1968
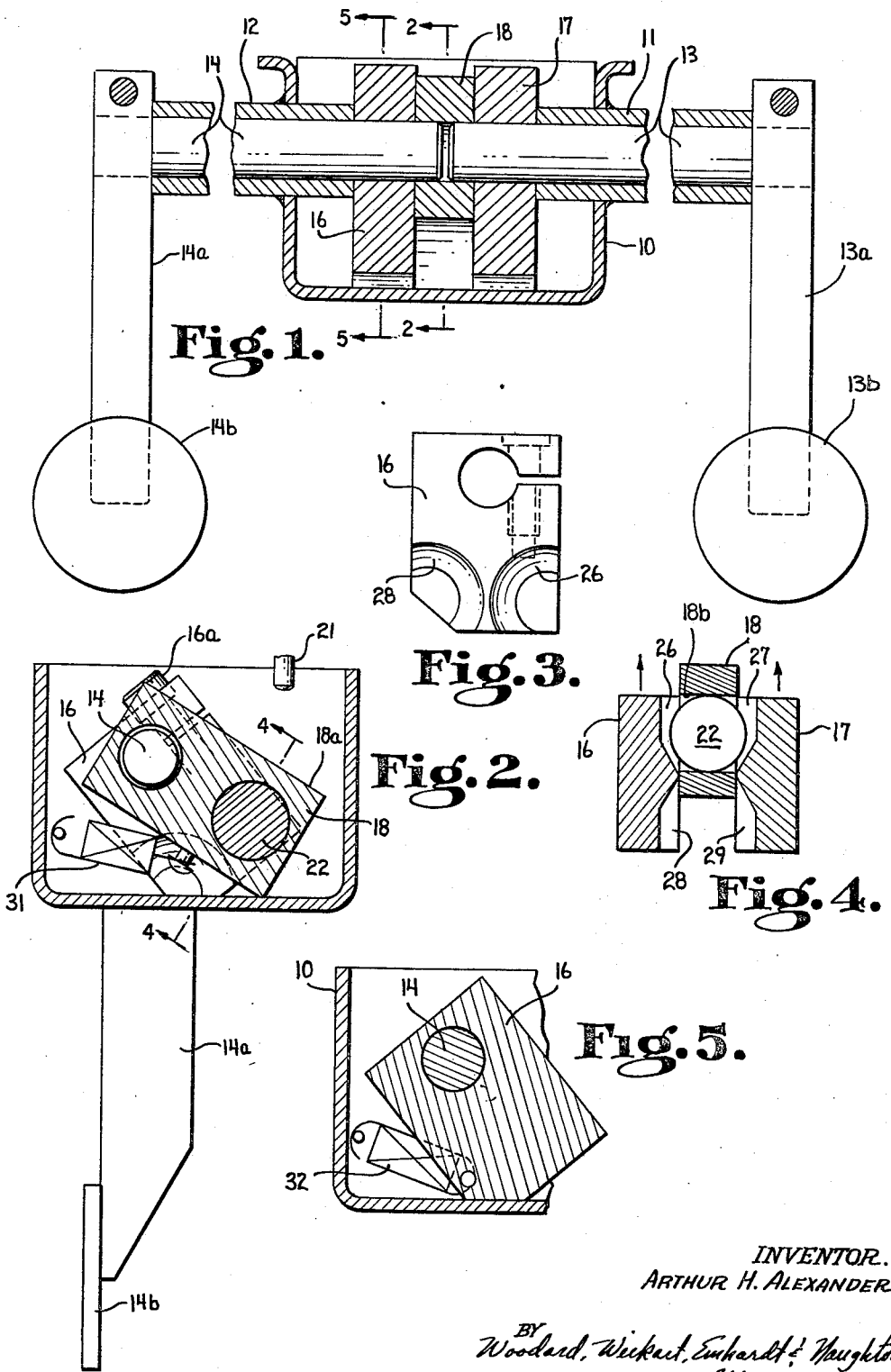
INVENTOR.
ARTHUR H. ALEXANDER
BY
Woodard, Weikart, Emhardt & Naughton
Attorneys United States Patent Office 3,491,867
Patented Jan. 27, 1970

3,491,867
TWO-HANDED SAFETY CONTROL
Arthur H. Alexander, 6433 N. Oakland Ave.,
Indianapolis, Ind. 46220
Filed Apr. 5, 1968, Ser. No. 719,180
Int. Cl. F16d 3/06, 71/00; B67b 3/26
U.S. Cl. 192—131                6 Claims

ABSTRACT OF THE DISCLOSURE

A control in which an operating abutment is moved only when two spaced members are moved in unison, the operating abutment carrying a caged ball whose movement in one plane is substantially unrestricted permitting movement of the spaced members independently of the abutment when the members are moved individually but moving the abutment with the members when the latter are both moved in unison.

BACKGROUND OF THE INVENTION (1) The field of the invention includes manually actuated devices for tripping, or otherwise controlling, punch presses, bending fixtures or any other type of machinery where operator safety requires that both hands of the operator be withdrawn from the machinery before it is tripped.

(2) Description of the prior art.—Devices of the type mentioned above are known in the prior art and customarily are actuated by spaced hand or palm actuators, the spacing being such as to prevent moving both actuators by one hand or arm of the operator. At the price of elaborate mechanical components and interaction of the components, the better of such devices in the prior art are constructed so that one of the actuators cannot be tied down and the device operated solely by the free actuator, and if one hand of the operator is removed from one of the actuators, the device shifts to deactuating position.

SUMMARY OF THE INVENTION

The concept of the present invention provides a two-handed safety control device in which, by means of a simple caged, but shiftable, member forming a connection between two manually actuated members and a controlling abutment, the two-handed safety control function is achieved without complicated and trouble-prone ratchet and latching components. The device cannot be tied down or bridged and maintaining the device in actuated position requires maintenance of both manually actuated members in actuated condition.

BRIEF DESCRIPTION OF THE DRAWINGS

FIG. 1 is a side sectional view of a safety control embodying the present invention.

FIG. 2 is a sectional view taken generally along the line 2—2 of FIG. 1.

FIG. 3 is a side view of one of the components of the structure shown in FIGS. 1 and 2.

FIG. 4 is a sectional view taken generally along the line 4—4 of FIG. 2.

FIG. 5 is a fragmentary, sectional view taken generally along the line 5—5 of FIG. 1.

DESCRIPTION OF THE PREFERRED EMBODIMENT

Referring initially to FIG. 1, the safety control device of the present invention includes a housing 10 with an open end adapting it for mounting on the surface of equipment to be controlled. Extending from opposite sides of the housing, and rigidly secured thereto, are tubes 11 and 12 within which are inserted the shafts 13 and 14, respectively. The shafts are axially-aligned and their ends are in substantially abutting relationship centrally within the housing 10.

The shafts 13 and 14 extend beyond their enclosing tubes and carry, clamped to their ends, palm actuators in the form of arms 14a and 13a and hand-contact discs 14b and 13b. Interiorly of the housing, the shaft 14 has rigidly secured thereto a member 16 of generally rectangular block form. As may best be seen in FIG. 2, the member 16 is clamped on the shaft by means of the threaded screw 16a. Similarly, the shaft 13 has clamped thereto the member 17, shaped in mirror-image resemblance to the member 16.

Disposed between the members 16 and 17 is a control member 18, also of generally rectangular configuration. The control member is provided with an aperture freely accommodating the extending ends of the shafts 13 and 14 which thereby establish the rotational axis of the control member, the control member 18 being free to rotate or move angularly about the centerline of the shafts.

As will be evident from FIG. 2, the upper marginal portion 18a of the control member is adapted to engage a device to be actuated when the control member 18 is rotated upwardly from its position of FIG. 2. The device to be actuated forms no part of the present invention and, in FIG. 2, is schematically indicated to be the thrust pin 21 of a switch. It will be understood that the member actuated might be an air valve or a hydraulic valve or any other similar control means having direct control of the machinery on which the safety device of the present invention is mounted.

As may best be seen in FIGS. 2 and 4, the control member 18 has an aperture 18b therethrough which freely accommodates a shiftable element 22. The shiftable element takes the form of a steel sphere or ball, although, it will be understood, this shiftable element might also take the form of a pin with rounded or conical ends, the functional requirement being that it be freely movable within the aperture 18b in a transverse direction.

As my best be seen in FIGS. 3 and 4 the members 16 and 17 are provided with annular cavities 26 and 27 which have inclined faces. FIG. 3 illustrates the functional surface of the member 16, however, it will be understood that the member 17 substantially duplicates this surface of the member 16. As indicated in FIG. 3, an identical, annular cavity 28 is also formed in the member 16 adjacent the cavity 26. Similarly, as may be seen in FIG. 4, the member 17 has an identical, annual cavity 29 formed therein adjacent the cavity 27.

The members 16 and 17, at the peaks between the cavities, extend into sliding engagement with the side margins of the control member 18 as will be evident from FIG. 4. The cavities 26 and 27 have a depth sufficient to permit either of the members 16 and 17 to be moved past the control member 18 upon rotation of the corresponding one of the shafts 13 or 14 while the other shaft is stationary. However, if both shafts 13 and 14, and therefore members 16 and 17, are moved in unison (as indicated by the arrows in FIG. 4) the peaked portions of the members 16 and 17 will engage the ball 22 and move the control member 18 upwardly with the members 16 and 17. This motion of the control member 18 takes place only if the members 16 and 17 are moved in unison. If one is moved while the other is stationary, the shiftable element 22 merely moves transversely in the aperture 18b and the shaft supported member moves past the member 18.

Such motion (upwardly, as viewed in FIG. 4) of both the members 16 and 17 and of the control member 18 is against a spring bias provided by tension springs attached to these members and anchored on the housing. The tension spring for the control member 18 is shown at 31 in FIG. 2 and the tension spring for the member 16 is identified at 32 in FIG. 5, the member 17 having an identical tension spring (not shown) attached to it. The cavities 28 and 29 in the members 16 and 17 are required because their inclined surfaces are necessary to permit return of either of the members 16 or 17 back to its position of FIG. 4 should it be moved past the shiftable element while the other of the shaft-supported elements is maintained stationary.

Thus, in operation, it may be seen that both palm actuators 13b and 14b must be depressed in unison to cause movement of the control element 18 to a position in which it actuates the thrust pin 21 (FIG. 2). If either actuator is moved alone, the corresponding shaft-supported member merely moves past the control member 18 as the element 22 shifts transversely. If, after both actuators are moved in unison to move the control member 18, either of the actuators is released, the bias tension springs attached to each of the elements 16, 17 and 18 will return the element 18 and the free one of the members 16 and 17 back to their position of FIG. 4, even though the actuated one of the members 16 and 17 is maintained in its actuated or upper position. The actuators are separated to prevent an operator from using one arm to actuate both members. While the housing may be centered on the span between the actuators 13b and 14b, it will be understoood that such centering of the housing is not functionally necessary. The simplified components and their interaction is inexpensive to fabricate and assemble and is therefore trouble-free.

While the invention has been disclosed and described in some detail in the drawings and foregoing description, they are to be considered as illustrative and not restrictive in character, as other modifications may readily suggest themselves to persons skilled in this art and within the broad scope of the invention.

What I claim is:

1. A two-handed safety control device comprising a housing, a control member mounted for rotational movement within the housing, two axially-aligned, end-abutting shafts extending from said housing and rotatable about their aligned longitudinal axes independently of each other, the longitudinal axes of said shafts establishing the rotational axis of said control member, two shaft-supported members each rigidly supported on one of said shafts and each rotatable within the housing upon rotation of its respective shaft, said members being disposed adjacent to and on opposite sides of said control member, a shiftable element freely carried by said control member and extending beyond opposite side surfaces thereof, said shaft-supported members each having a cavity formed in its surface accommodating the extending portions of said shiftable element, said cavities having a depth sufficient to permit one of said shaft-supported members to be rotated past said control member upon rotation of its shaft while the other shaft is stationary, said shaft-supported members engaging the extending portions of said shiftable element and rotationally moving said control member when said shafts are moved in unison.

2. A two-handed safety control device as claimed in claim 1 in which said control member is provided with an aperture into which both of said shafts extend so that the axis of rotation of said control member coincides with the axis of rotation of said shafts.

3. A two-handed control device as claimed in claim 1 in which resilient means biases said shaft-supported elements and said control member in the same direction.

4. A two-handed control device as claimed in claim 1 in which said shiftable element is freely accommodated within an aperture extending through said control member.

5. A two-handed control device as claimed in claim 4 in which said shiftable element has a spherical shape.

6. A two-handed safety control device comprising a housing, a control member mounted for movement within the housing, two shafts extending from said housing and movable independently of each other, two shaft-supported members each rigidly supported on one of said shafts and each movable within the housing upon movement of its respective shaft, said members being disposed adjacent to and on opposite sides of said control member, a shiftable element freely carried by said control member and extending beyond opposite side surfaces thereof, said shaft-supported members each having a cavity formed in its surface accommodating the extending portions of said shiftable element, said cavities having a depth sufficient to permit one of said shaft-supported members to be moved past said control member upon movement of its shaft while the other shaft is stationary, said shaft-supported members engaging the extending portions of said shiftable element and moving said control member when said shafts are moved in unison.

References Cited

UNITED STATES PATENTS

| 2,473,167 | 6/1949 | Mills | 192—131 X |
| 3,246,728 | 4/1966 | Hicks et al. | 192—131 |

MILTON KAUFMAN, Primary Examiner

U.S. Cl. X.R.

100—53